United States Patent
Woo et al.

(10) Patent No.: US 7,263,091 B1
(45) Date of Patent: Aug. 28, 2007

(54) SCALABLE ROUTING SYSTEM

(75) Inventors: Hsien-Chung Woo, Fremont, CA (US); Dennis C. Ferguson, Palo Alto, CA (US); Scott Mackie, Santa Cruz, CA (US); Manoj Leelanivas, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1000 days.

(21) Appl. No.: 10/156,720

(22) Filed: May 23, 2002

(51) Int. Cl.
*H04L 12/28* (2006.01)
(52) U.S. Cl. .................. 370/351; 370/353
(58) Field of Classification Search .......... 370/352
See application file for complete search history.

(56) References Cited

U.S. PATENT DOCUMENTS

| | | | |
|---|---|---|---|
| 6,078,963 A * | 6/2000 | Civanlar et al. ............ 709/238 |
| 6,473,434 B1 * | 10/2002 | Araya et al. ................ 370/412 |
| 6,490,246 B2 * | 12/2002 | Fukushima et al. ......... 370/220 |
| 6,496,510 B1 * | 12/2002 | Tsukakoshi et al. ........ 370/401 |
| 6,674,743 B1 * | 1/2004 | Amara et al. ............... 370/351 |
| 6,807,172 B1 * | 10/2004 | Levenson et al. ........... 370/389 |
| 6,831,898 B1 * | 12/2004 | Edsall et al. ................ 370/256 |
| 6,850,531 B1 * | 2/2005 | Rao et al. .................... 370/401 |
| 6,876,663 B2 * | 4/2005 | Johnson et al. ............. 370/416 |
| 6,894,970 B1 * | 5/2005 | McDermott et al. ........ 370/220 |
| 6,947,415 B1 * | 9/2005 | Nagaraj ...................... 370/389 |
| 6,954,463 B1 * | 10/2005 | Ma et al. ..................... 370/401 |
| 6,990,103 B1 * | 1/2006 | Gollamudi ............. 370/395.31 |
| 7,003,582 B2 * | 2/2006 | Basso et al. ................. 709/242 |
| 7,111,206 B1 * | 9/2006 | Shafer et al. .................. 714/48 |
| 2003/0185226 A1 * | 10/2003 | Tang et al. ................. 370/428 |
| 2004/0034871 A1 * | 2/2004 | Lu et al. ...................... 725/111 |
| 2004/0139071 A1 * | 7/2004 | Lee et al. ........................ 707/3 |
| 2005/0089038 A1 * | 4/2005 | Sugai et al. ................. 370/394 |

* cited by examiner

Primary Examiner—Phirin Sam
(74) Attorney, Agent, or Firm—Shumaker & Sieffert, P.A.

(57) ABSTRACT

A routing system decouples the routing functionality from the packet forwarding functionality. The decoupling of functionality is accomplished by coupling a set of routing engines to a set of packet-forwarding engines via a switch. The decoupling of functionality allows the routing system to easily be reconfigured and scaled. The decoupling of functionality also reduces the susceptibility of concurrently executing software processes from the malfunction of a single software process.

38 Claims, 4 Drawing Sheets

SCALABLE ROUTING SYSTEM

TECHNICAL FIELD

The invention relates to computer networks and, more particularly, to systems for routing packets within the networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

The router periodically receives packets that do not need to be forwarded to other destinations, but that need to be processed by the router. For example, the router may support a number of protocols, such as the Border Gateway Protocol (BGP), for exchanging route information with other routing devices. The router processes the BGP packets and updates the routing table. In addition, the router may be configured to support a number of other network protocols. For example, the router may support Address Resolution Protocol (ARP), which is a TCP/IP-based protocol for converting an IP address into a physical address, such as an Ethernet address. As another example, the router may support Telnet or other similar protocols to provide an interface for remote configuration.

To support these protocols, a conventional router typically includes a number of software processes executing on a processor. A routing process, for example, may include one or more threads that implement the various protocols supported by the router. In particular, the process may include threads that implement protocols for exchanging route information with other routing devices and for updating the routing table. The routing process may also include threads to support other protocols, such as threads that implement a TCP/IP network stack.

The router typically includes additional software processes, such as a software process that controls the physical configuration of the router. This process, often referred to as chassis manager, is responsible for managing the physical configuration of the router, such as the powering up the router, recognizing the hardware components of the router, bringing hardware components to a functional state to allow for setup of the logical components, and the like. The concurrently executing software processes of conventional routers can be susceptible to failure. If one software process malfunctions, possibly due a programming bug, the functionality of the other software processes can be affected, or even halted. This also implies a limitation of CPU bandwidth as all the concurrently executing processes are competing for the same CPU bandwidth.

SUMMARY

In general, the invention is directed to a scalable routing system in which routing functionality is decoupled from packet forwarding functionality. In one embodiment consistent with the principles of the invention a method comprises coupling a set of packet-forwarding engines to a set of routing engines. The routing engines maintain routing information that describes a topology of a network. The method further comprises forwarding packets with the packet-forwarding engines in accordance with the routing information maintained by the routing engines. The method may further comprise configuring a switch to communicatively couple the set of packet-forwarding engines to the set of routing engines.

In another embodiment consistent with the principles of the invention, a system comprises a set of routing engines to store routing information describing a topology of a network, and a set of packet-forwarding engines to forward packets in accordance with the routing information. The system further comprises a switch to couple the packet-forwarding engines to the routing engines.

In another embodiment consistent with the principles of the invention, a computer-readable medium comprises instructions to cause a programmable processor to receive configuration information from a user. The medium further comprises instructions to cause the process to couple a set of packet-forwarding engines to a set of routing engines in response to the configuration information received from a user.

In another embodiment consistent with the principles of the invention, a routing system comprises a set of routing engines configured to act as a single network router. The routing engines maintain routing information describing a topology of a network. The routing system may further comprise a set of packet-forwarding engines coupled to the routing engines via a switch. The packet-forwarding engines forward packets in accordance with the routing information maintained by the routing engines.

The invention may provide a number of advantages. The routing system described herein decouples routing functionality from packet forwarding functionality, allowing the system to be easily reconfigured and scaled to support increased bandwidth as needed. To increase the number of links serviced by the routing system, a user may add one or more packet-forwarding engines to the routing system. To increase dedicated functionality for each routing process, the user may add routing engines. In either case, the switch can be reconfigured to selectively couple one or more of the packet-forwarding engines to each of the routing engines as desired. Furthermore, the routing engine may maintain instructions defining a logical interface. Upon reconfiguring the switch, the routing engine may send the instructions to the packet-forwarding engine for setting up the logical interfaces. In this manner, the selective coupling of the routing engines and the packet forwarding engines allows for control of individual logic interfaces, such as Virtual Local Area Networks (VLANs), Data Link Control Interfaces (DLCIs), and Asynchronous Transfer Mode Virtual Circuits (ATM VCs).

In addition, the routing system may be less susceptible to failure. If one component, such as a software process, malfunctions, due to a software bug or other error condition, the functionality of the other components may not be affected. For example, if a routing process that provides a particular service fails, other routing processes that provide different services will not be affected.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
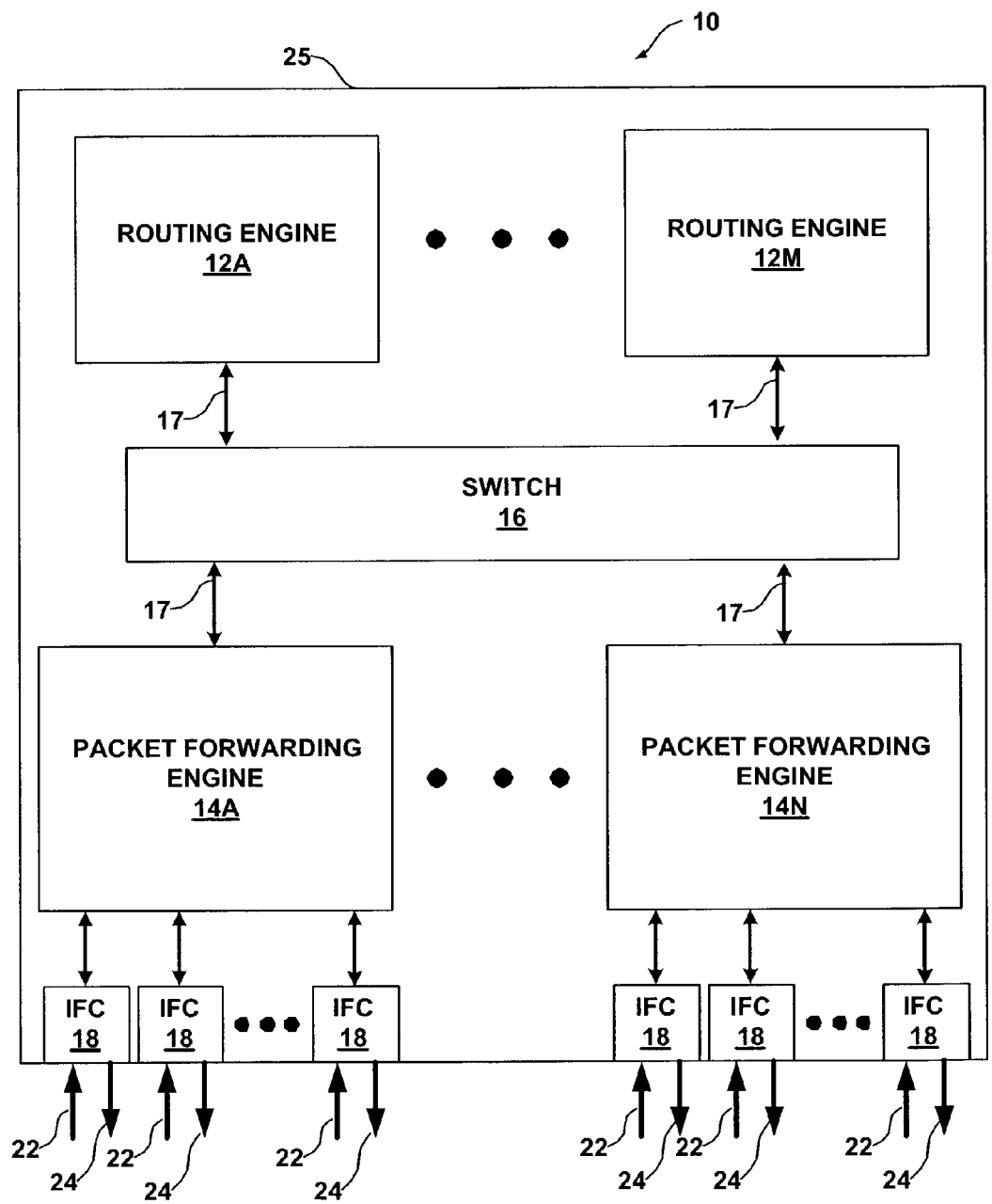
FIG. 1 is a block diagram illustrating one embodiment of an example routing system consistent with the principles of the invention.

FIG. 1 is a block diagram illustrating a scalable network routing system 10 in which the routing functionality is decoupled from packet forwarding functionality in accordance with the principles of the invention. In particular, routing system 10 includes a plurality of routing engines 12A through 12M, collectively referred to as routing engines 12. Switch 16 selectively couples routing engines 12 to a plurality of packet-forwarding engines 14A through 14N, collectively referred to as packet-forwarding engines 14. Each of routing engines 12 can be coupled to one or more of packet-forwarding engines 14 in a non-exclusive manner. In other words, multiple ones of routing engines 12 can share common packet-forwarding engines 14, can be mapped exclusively to respective subsets of packet-forwarding engines 14, or any combination thereof.

Switch 16 comprises a configurable electronic switch for selectively coupling routing engines 12 to packet-forwarding engines 14. Accordingly, switch 16 selectively communicates data packets between routing engines 12 and packet-forwarding engines 14 via links 17. Switch 16 may comprise, for example, switch fabric, switchgear, a configurable network switch or hub, and the like. Links 17 may comprises any form of communication path, such as electrical paths within an integrated circuit, external data busses, optical links, network connections, wireless connections, and the like.

In the exemplary embodiment illustrated in FIG. 1, each of packet-forwarding engines 14 is coupled to one or more interface cards (IFCs) 18, for receiving and sending data packets via network links 22 and 24, respectively. IFCs 18 are typically coupled to network links 22, 24 via a number of interface ports. In general, routing system 10 receives inbound packets from network links 22, determines destinations for the received packets, and outputs the packets on network links 24 based on the destinations.

Each of routing engines 12 is independently responsible for maintaining routing information that describes a topology of a network and, in particular, routes through the network. The routing information may include, for example, route data that describes various routes within the network, and corresponding next hop data indicating appropriate neighboring devices within the network for each of the routes. Each of routing engines 12 periodically updates its corresponding routing information to accurately reflect the network topology.

In accordance with its routing information, each of routing engines 12 analyzes its stored routing information and generates forwarding information for the packet-forwarding engines 14 to which it is coupled via switch 16. The forwarding information may associate, for example, network destinations with specific next hops and corresponding interface ports of IFCs 18. The forwarding information may, therefore, be thought of as a subset of the information contained within the routing information maintained by routing engines 12.

Packet-forwarding engines 14 receive the forwarding information from the routing engines 12 to which they are coupled via switch 16. Each of packet-forwarding engines 14 may aggregate the forwarding information received from different ones of routing engines 12. In this manner, each of packet-forwarding engines 14 may maintain a single data structure that aggregates the forwarding information received from the set of routing engines 14 to which each of packet-forwarding engines 14 is coupled via switch 16. Alternatively, each of packet-forwarding engines 14 may maintain the forwarding information separately.

Upon receiving inbound packets, packet-forwarding engines 14 direct the inbound packets to appropriate IFCs 18 for transmission based on the forwarding information. In one embodiment, each of packet-forwarding engines 14 and routing engines 12 may comprise one or more dedicated processors, software, hardware, and combinations thereof.

In this manner, routing system 10 decouples routing functionality from packet forwarding functionality. Accordingly, routing system 10 may readily be scaled. To increase the number of service links 22, 24, for example, additional packet-forwarding engines 14 and IFCs 18 may be added to routing system 10 as needed. To increase dedicated functionality for each routing process, additional routing engines 12 may be added to routing system 10. In either case, switch 16 need only be reconfigured to selectively couple routing engines 12 with packet-forwarding engines 16 as desired. Reconfiguration of switch 16 may be done automatically, manually, or both. Selectively coupling of routing engines 12 and packet forwarding engines 14 may further allow for control of individual logic interfaces, such as Virtual Local Area Networks (VLANs), Data Link Control Interfaces (DLCIs), or Asynchronous Transfer Mode Virtual Circuits (ATM VCs). For instance, routing engines 14 may maintain configuration information defining a logical interface. Upon reconfiguring the switch, routing engine 14 may direct the corresponding packet-forwarding engines 16 to set up the logical interface in accordance with the configuration information.

Routing system 10 includes a chassis 25 for housing routing engines 12, packet-forwarding engines 14, switch 16, and interface cards 18. However, the scalability of routing system 10 may be further increased by physically separating the components into multiple chassis, thereby augmenting the logical separation of the functionality.

Figure 2:
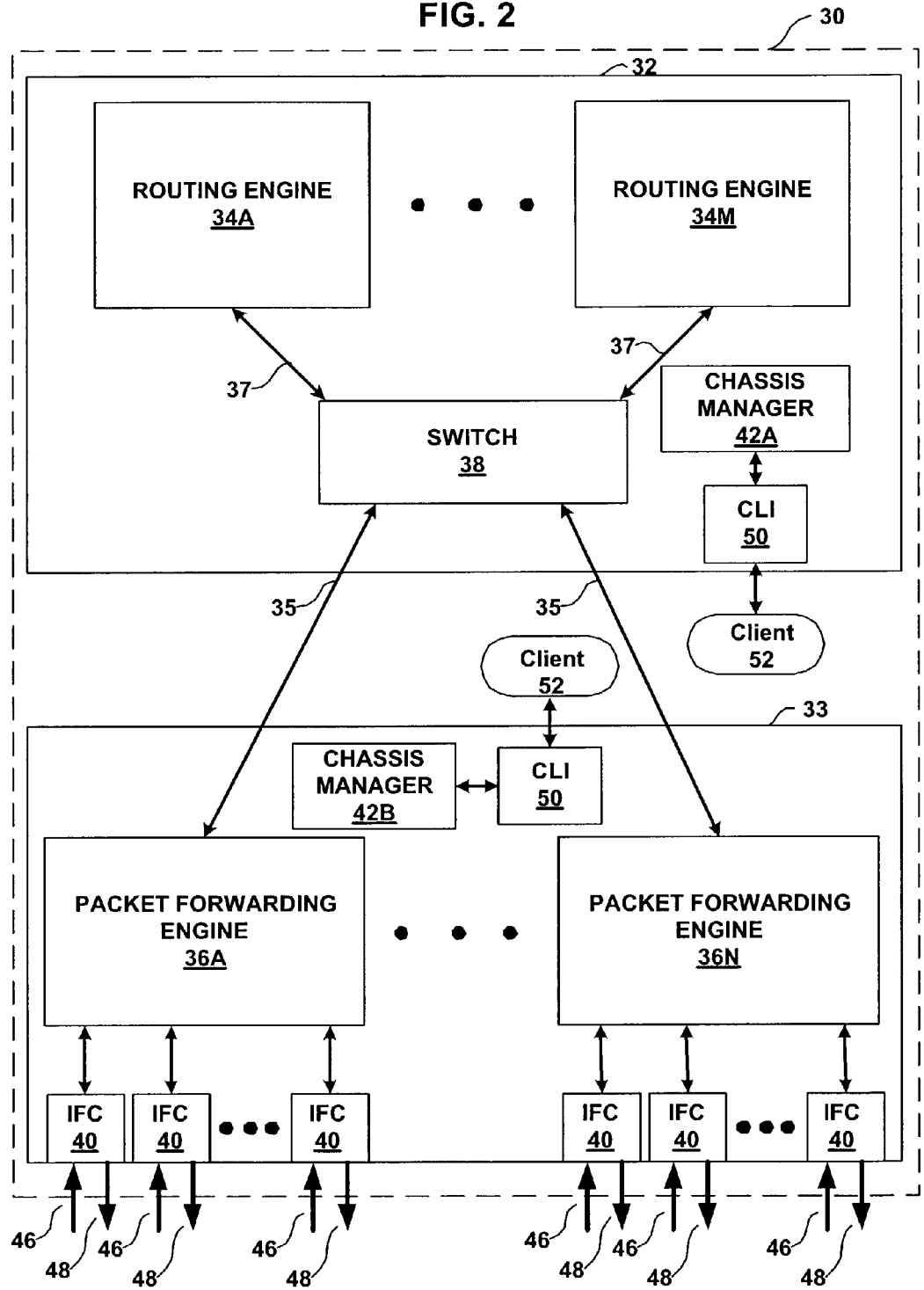
FIG. 2 is a block diagram illustrating another embodiment of an example routing system.

FIG. 2 is a block diagram illustrating an example routing system 30 having multiple chassis, thereby lending to reconfiguration and scalability. In particular, routing system 30 includes a first chassis 32 and a second chassis 33 coupled by cables 35. Cables 35 may comprise any form of communication path for coupling physically separate components, such as one or more backplanes, optical links, Ethernet and other network connections, wireless connections, and the like.

Chassis 32 houses a plurality of routing engines 34A to 34M, collectively referred to as routing engines 34, a switch 38, a chassis manager 42A, and a command line interface (CLI) 50. Chassis 33 houses a plurality of packet-forwarding engines 36A to 36N, collectively referred to as packet-forwarding engines 36, that are coupled to a number of sets of IFC's 40, a chassis manager 42B, and a CLI 50. Routing engines 34 can be coupled to one or more of packet-forwarding engines 36 in a non-exclusive manner. In this embodiment, the components are separated as described above. This division of components is not unique and should not limit the claim of the invention. For example, switch 38 could be housed on chassis 33, instead of chassis 32.

Switch 38 comprises a configurable electronic switch for selectively coupling routing engines 34 to packet-forwarding engines 36. Switch 38 selectively communicates data packets between routing engines 34 and packet-forwarding engines 36 via links 37 and cables 35. Switch 38 may comprise, for example, switch fabric, switchgear, a configurable network switch, and the like. Link 37 may comprise any form of communication path.

In the exemplary embodiment illustrated in FIG. 2, each of the packet-forwarding engines 36 is linked to one or more interface cards (IFCs) 40 for receiving and sending data packets via network links 46 and 48, respectively. In general, routing system 30 receives inbound packets from network links 46, determines destinations for the received packets, and outputs the packets on network links 48 based on the destinations.

Each of the routing engines 34 is responsible for maintaining routing information, including the topology of the network, and more specifically, the routes through the network. In accordance with the routing information, each routing engine 34 analyzes the routing information and generates a forwarding table for each packet-forwarding engine 36 to which it is coupled via links 37 and cables 35. The forwarding information may associate, for example, network destinations with specific next hops and corresponding interface ports of IFCs 40.

Packet-forwarding engines 36 receive the forwarding information from the routing engines 34 to which they are coupled via switch 38. Packet-forwarding engines 36 may then aggregate the forwarding information received from each of the routing engines 34 to which it is coupled into one single data structure. Alternatively, the packet-forwarding engine 36 may keep forwarding information received from each routing engine 34 in separate data structures.

Upon receiving inbound packets, packet-forwarding engines 36 direct the inbound packets to appropriate IFCs 40 for transmission based on the forwarding information. In one embodiment, each of packet-forwarding engines 36 and routing engines 34 may comprise one or more dedicated processors, software, hardware, and combinations thereof.

Chassis 32, 33 contain chassis managers 42A and 42B, respectively. Chassis managers 42A and 42B, collectively referred to as chassis managers 42, manage the physical configuration of the chassis 32, 33, and are typically implemented as software processes. More specifically, these process are responsible for managing the physical configuration of the chassis including powering up the router, recognizing the packet-forwarding engines 36, bringing packet-forwarding engines 36 to a functional state to allow for setup of the logical components, and the like. In addition, chassis manager 42A contains information describing the particular set of routing engines 34 to which packet-forwarding engines 36 are coupled. Chassis manager 42B contains information about the forwarding protocol of packet-forwarding engines 36, network protocols of the routing system 30, and the like.

Another software process that executes concurrently with the router process is the command line interface (CLI) 50. The CLI is a user interface process that allows a client 52, such as a remote system administrator or script, to configure the chassis 32, 33. Upon receiving a request from client 52, CLI 50 relays the request to chassis manager 42. Chassis manager 42 extracts the data from the request and reconfigures routing systems 30 physical configuration. Switch 38 need only be reconfigured to selectively couple routing engines 34 with packet-forwarding engines 36 as desired. Reconfiguration of switch 38 may be done automatically, manually, or both.

In this manner, routing system 30 decouples routing functionality from packet forwarding functionality. Accordingly, routing system 30 may readily be scaled as needed. To increase the number of service links 46,48, for example, additional packet-forwarding engines 36 and IFCs 40 may be added to routing system 30 as needed. To increase the dedicated functionality for each routing process additional routing engines 34 may be added to routing system 30. In either case, switch 38 need only be reconfigured to selectively couple routing engines 34 with packet-forwarding engines 36 as desired. The separate chassis 32, 33 increase the scalability of routing system 30 by physically separating the components, thereby augmenting logical separation of the functionality.

Figure 3:
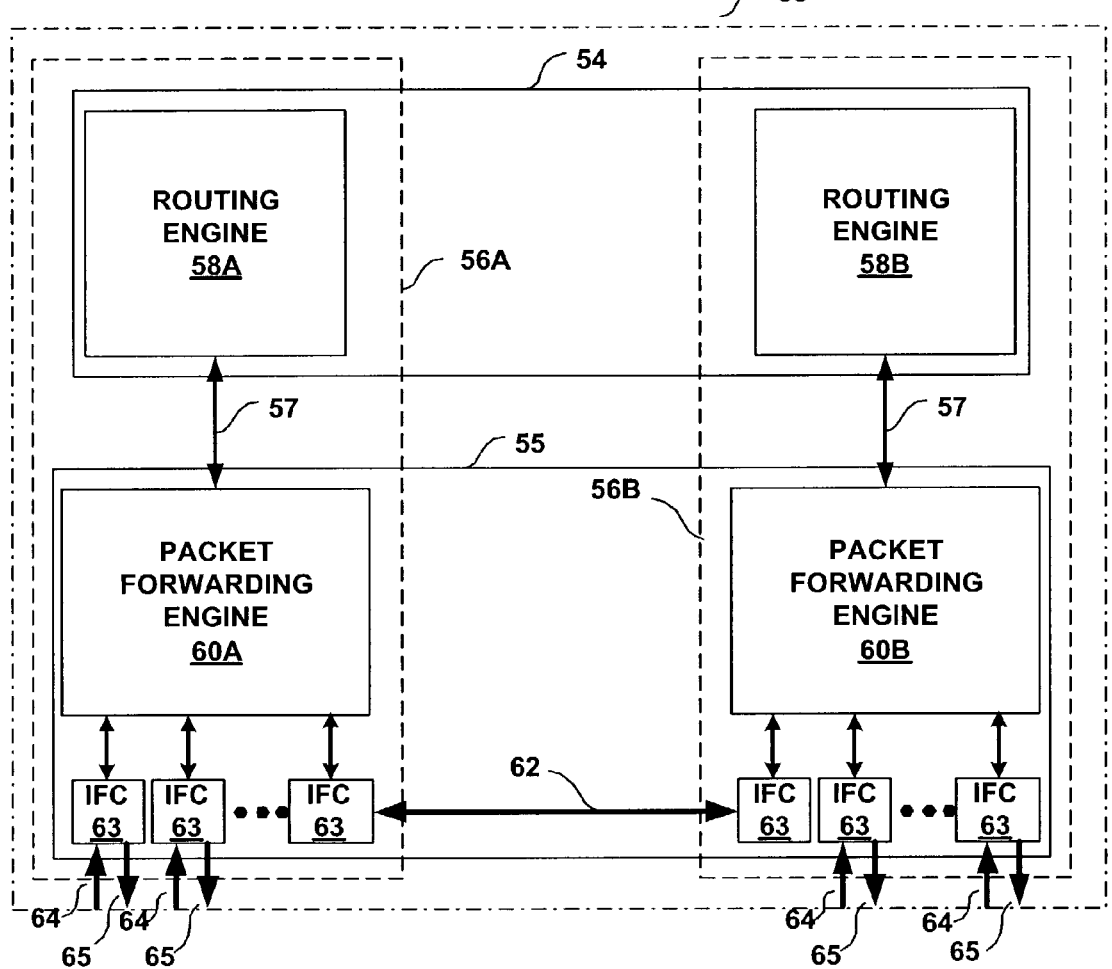
FIG. 3 is a block diagram illustrating another example routing system that makes use of a virtual link to forward packets between two routers of the routing system.

FIG. 3 is a block diagram illustrating an example of a routing system 53 with a virtual link 62, thereby allowing a data packet to be forwarded directly between a first router 56A and a second router 56B. In this manner, packet-forwarding engines 60 can achieve increased throughput and forwarding efficiency In particular, routing system 53 includes a first chassis 54 and a second chassis 55 coupled by cables 57. Cables 57 may comprise any form of communication path for coupling physically separate components, such as one or more backplanes, optical links, Ethernet and other network connections, wireless connections, and the like.

Chassis 54 houses a set of routing engines 58A and 58B, collectively referred to as routing engines 58. Chassis 55 houses a set of packet-forwarding engines 60A and 60B, collectively referred to as packet-forwarding engines 60. Each of packet-forwarding engines 60 is linked to a set of one or more interface cards (IFCs) 63 for receiving and sending data packets via network links 64 and 65, respectively. Although illustrated in this manner, routing engines 58 and packet-forwarding engines 60 may have any number of routing engines and packet-forwarding engines, respectively.

In the exemplary embodiment illustrated in FIG. 3, packet-forwarding engines 60A, 60B are coupled with routing engines 58A, 58B, respectively, to form routers 56A, 56B. Routing engines 58 and packet-forwarding engines 60 may be statically coupled, as indicated in FIG. 3, or may make use of a switch for dynamic reconfiguration, as described above. Each of routing engines 58 maintains routing information that describes the topology of a network and, in particular, routes through the network. The routing information may include, for example, route data that describes various routes within the network, and corresponding next hop data indicating appropriate neighboring devices within the network for each of the routes. Each of routing engines 58 periodically updates its corresponding routing information to accurately reflect the network topology.

Routing engines 58 analyze the routing information generate forwarding information for packet-forwarding engines 60. For example, in the embodiment illustrated in FIG. 3, routing engine 58A develops forwarding information for packet-forwarding engine 60A and routing engine 58B develops forwarding information for packet-forwarding engine 60B. The forwarding information may contain information about the routes through the network, and may associate network destinations with next hops and interface ports of the IFCs 63.

Packet forwarding engines 60 establish a virtual link 62, thereby increasing bandwidth and the efficiency of the forwarding process. Virtual link 62 comprises a hardwired link between packet-forwarding engines 60. The link is referred to as "virtual" because there is no physical external link, such as an optical links 64, 65. Nevertheless, routing engines 58 treat virtual link 62 the same as network links 64, 65. Specifically, the routing information maintained by routing engines 58 makes use of virtual link 62 as any other network link 64, 65. In this manner, routing engines 58 include virtual link 62 within the routing information, and generate the forwarding information for packet-forwarding engines 60 accordingly. In this manner, virtual link 62 provides an internal, hardwired connection by which router 56A and router 56B communicate packets without sending the packets through the network.

In general, upon receiving a packet, packet-forwarding engine 60A directs an outbound packet to the output link 65 of an appropriate IFC 63 based on the forwarding information received from routing engine 58A. In this fashion, the packet normally must travel through the network to reach the next hop. In similar fashion, packet-forwarding engine 60A may forward a packet directly to packet-forwarding engine 60B via virtual link 62, thereby bypassing the network.

In this manner, routers 56 of routing system 53 may be configured to act independently, even though they may share common components that reside in shared chassis. Similarly, routers 56 may independently route packets even with the incorporation of a switch to dynamically couple routing engines 58 and packet-forwarding engines 60. However, in another mode of operation, routers 56 may be configured to act as a single "logical" router. In this mode, routers 56 can operate as a single router with regard to packets forwarded via virtual link 62. To other nodes within the network, routers 56 appear as a can appear as a single router.

Figure 4:
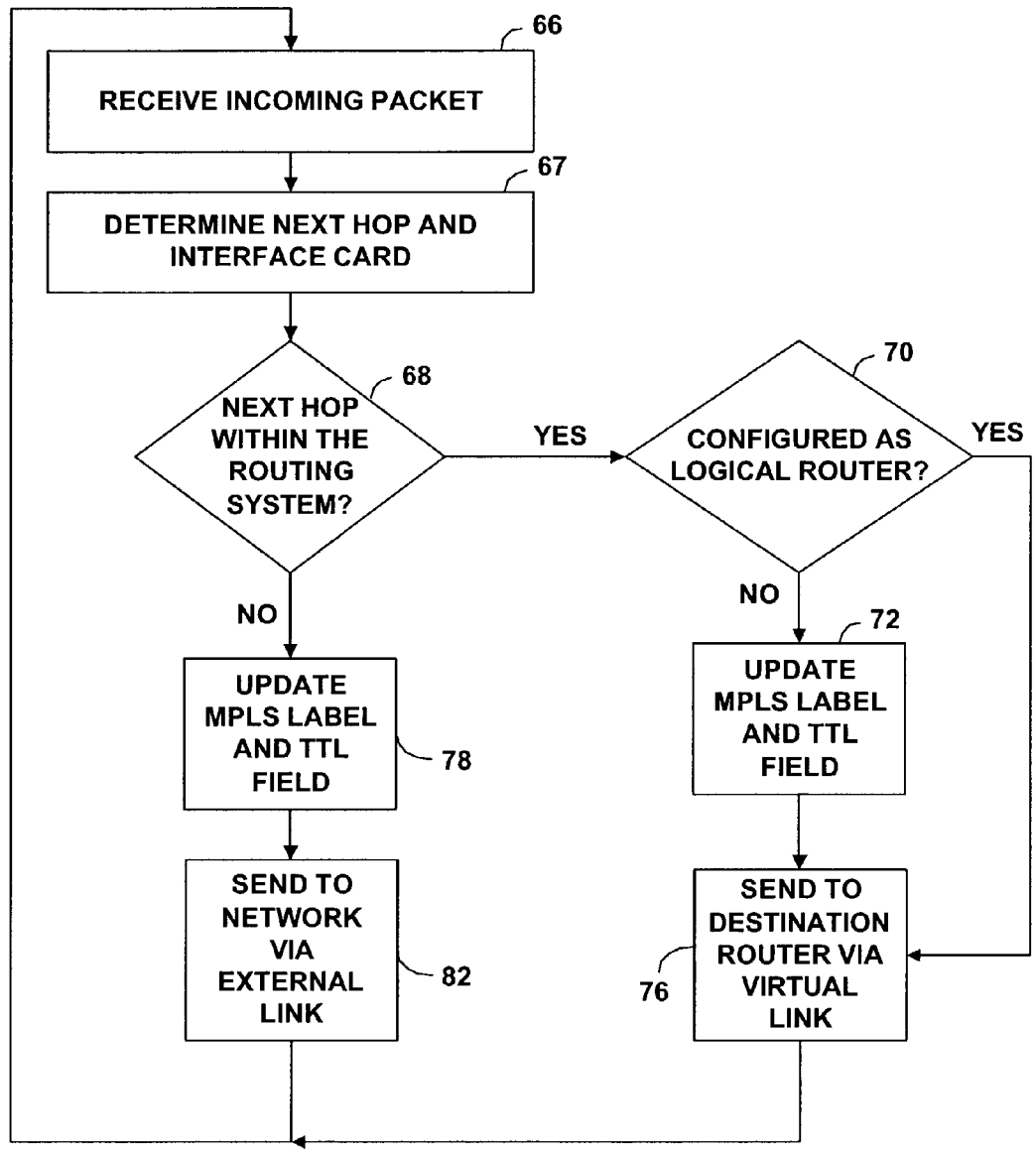
FIG. 4 is a flowchart illustrating an example mode of operation of the routing system of FIG. 3 when configured to operate as a single, logical router.

FIG. 4 is a flowchart illustrating an example mode of operation of routing system 53 of FIG. 3, in which routers 56 in the routing system 53 act as a single "logical" router. For exemplary purposes, this mode of operation is described with reference to packet-forwarding engine 60. Initially, packet-forwarding engine 60A receives an inbound packet via network link 64 (66). Packet-forwarding engine 60A examines the data packet for information to determine the next hop for the packet in accordance with the forwarding information received from routing engine 58A (67).

If the next hop comprises one of routers 56 within the routing system 53 (68), such as router 56B, packet-forwarding engine 60A determines whether routing system 53 is configured to operate as a single router (70). If not, packet-forwarding engine 60A processes the packet as other packets destined for the network. For example, packet-forwarding engine 60A updates a time-to-live (TTL) field for the packet, as well as label information for the packet (72).

More specifically, each data packet that arrives at a router 56 contains a label containing information such as the destination, bandwidth, a TTL field, and the like, according to a label protocol. One exemplary type of label protocol is multiprotocol label switching (MPLS). Unless configured to operate as a single router, packet-forwarding engine 60A of first router 56A updates the MPLS label before forwarding the packet to the next hop. Updating of the MPLS label typically includes stripping off the existing label, and attaching a new label to the packet. In addition, packet-forwarding engine 60A typically updates the TTL field, which controls how many hops a packet can travel before being discarded or returned. If the TTL of the outgoing packet, herein referred to as oTTL, is greater than zero, then packet-forwarding engine 60A typically forwards the packet and decrements the TTL. If the oTTL is not greater than zero, then packet-forwarding engine 60A does not forward the packet, but either discards or returns the packet.

Upon updating the packet, packet-forwarding engine 60A forwards the packet to packet-forwarding engine 60B via virtual link 62 (76). If the routing system 53 is configured to operate as a single router, packet-forwarding engine 60A does not update the packet prior to forwarding the packet to packet-forwarding engine 60B. In other words, in this mode of operation, packet-forwarding engine 60A forwards the packet to packet-forwarding engine 60B without updating the information of the label. In this manner, the outbound packets existing routing system 53 appear as if processed by a single router.

If the next hop does not comprise one of routers 56 within routing system 53 (68), packet-forwarding engine 56A updates the TTL field of the packet and the label information (78), and forwards the packet to the network via one of interface cards 63 and outbound links 65 (82).

The flexibility of routing system 53 allows a user, such as a network administrator, to configure the forwarding protocol of routing system 53 as needed. If routing system 53 were located in the access area of the network (near the edges), for example, the network administrator may wish to configure routers 56 to operate independently. However, if routing system 53 is located within a core area of the network, the network administrator may wish to configure routers 56 to appear as a single router. In this mode, routers 56 operate with MPLS disabled when forwarding packets via virtual link 62. In this manner, the MPLS label and the TTL field of outbound packets from routing system 53 indicate that the packet has been processed by a single router.

A number of embodiments of the present invention have been described. Nevertheless, it will be understood that various modifications may be made without departing from the spirit and scope of the invention. Accordingly, other embodiments are within the scope of the following claims.

The invention claimed is:

1. A method comprising:
   receiving configuration information for configuring the physical configuration of a router from a user;
   selectively coupling a set of packet-forwarding engines to a set of routing engines to reconfigure the physical configuration of the router in response to the configuration information, wherein each of the routing engines maintains respective routing information describing a topology of a network, and wherein at least one of the packet-forwarding engines is coupled to less than all the routing engines of the set of routing engines; and
   forwarding packets with the packet-forwarding engines in accordance with the routing information.

2. The method of claim 1, wherein selectively coupling a set of packet-forwarding engines to a set of routing engines comprises selectively coupling at least one of the routing engines to a plurality of the packet-forwarding engines.

3. The method of claim 1, wherein selectively coupling a set of packet-forwarding engines to a set of routing engines comprises reconfiguring a switch to communicatively couple the set of packet-forwarding engines to the set of routing engines.

4. The method of claim 3, wherein the switch comprises a packet-switching network switch having a plurality of network ports coupled to the routing engines and the packet-forwarding engines.

5. The method of claim 3, wherein the switch comprises one or a crossbar switch and a switch fabric.

6. The method of claim 1, wherein forwarding packets comprises forwarding packets from a first one of the packet-forwarding engines to a second one of the packet-forwarding engines via a virtual network link.

7. The method of claim 6, further comprising selectively updating labels of the packets.

8. A method comprising:
selectively coupling a set of packet-forwarding engines to a set of routing engines to reconfigure a router in response to configuration information received from a user, wherein each of the routing engines maintains respective routing information describing a topology of a network;
forwarding packets with the packet-forwarding engines in accordance with the routing information, wherein forwarding packets comprises forwarding packets from a first one of the packet-forwarding engines to a second one of the packet-forwarding engines via a virtual network link; and
selectively updating time to live (TTL) fields of the packets.

9. The method of claim 1, further comprising:
generating forwarding information in accordance with the routing information;
communicating the forwarding information from the routing engines to the packet-forwarding engines; and
forwarding the packets in accordance with the forwarding information.

10. The method of claim 9, further comprising aggregating within the packet-forwarding engines the forwarding information received from different routing engines.

11. A system comprising:
a set of routing engines, each maintaining respective routing information describing a topology of a network;
a set of packet-forwarding engines to forward packets in accordance with the routing information;
a switch to selectively couple the packet-forwarding engines to the routing engines, and
an interface to receive configuration information from a user, wherein the switch is reconfigured to selectively couple the set of packet-forwarding engines to the set of routing engines to reconfigure the physical configuration of the system in response to the configuration information.

12. The system of claim 11, wherein the switch couples at least one of the routing engines to more than one of the packet-forwarding engines.

13. The system of claim 11, wherein the set of packet-forwarding engines comprises M packet-forwarding engines, and further wherein the set of routing engines comprises N routing engines.

14. The system of claim 13, where M equals 1 and N is greater than 1.

15. The system of claim 13, where N equals 1 and M is greater than 1.

16. The system of claim 13, where M is greater than N.

17. The system of claim 13, where N is greater than M.

18. The system of claim 11, wherein the switch comprises a packet-switching network switch having a plurality of network ports coupled to the routing engines and the packet-forwarding engines.

19. The system of claim 11, wherein the switch comprises one of a crossbar switch and a switch fabric.

20. The system of claim 11, further comprising:
a first chassis to house the routine engines; and
a second chassis to house the packet-forwarding engines.

21. The system of claim 11 further comprising a set of interface cards coupled to each of the packet-forwarding engines.

22. The system of claim 21, wherein the packet-forwarding engines associates each of the interface cards with one of the routing engines.

23. The system of claim 11, wherein the packet-forwarding engines selectively update labels of the packets.

24. A system comprising:
a set of routing engines, each maintaining respective routing information describing a topology of a network;
a set of packet-forwarding engines to forward packets in accordance with the routing information; and
a reconfigurable switch to selectively couple the packet-forwarding engines to the routing engines,
wherein the packet-forwarding engines selectively update time to live (TTL) fields of the packets.

25. A system comprising:
a set of routing engines, each maintaining respective routing information describing a topology of a network;
a set of packet-forwarding engines to forward packets in accordance with the routing information; and
a reconfigurable switch to selectively couple the packet-forwarding engines to the routing engines,
wherein the routing engines generate forwarding information in accordance with the routing information, and communicate the forwarding information to the packet-forwarding engines of the set of packet-forwarding engines to which the respective routing engines are coupled via the switch, and further wherein the packet-forwarding engines forward the packets in accordance with the forwarding information received from the ones of the routing engines of the set to which the respective packet forwarding engines are coupled, at least one of the packet-forwarding engines being coupled to less than all the routing engines of the set of routing engines.

26. The system of claim 25, wherein each of the packet-forwarding engines maintains a data structure to aggregate the forwarding information received from the routing engines via the switch.

27. A computer-readable medium comprising instructions to cause a processor to:
receive configuration information from a user; and
selectively couple a set of packet-forwarding engines to a set of routing engines in response to the configuration information, wherein at least one of the packet-forwarding engines is coupled to less than all of the routing engines.

28. The computer-readable medium of claim 27, further comprising instructions to cause the processor to configure the set of routing engines and the set of packet-forwarding engines in accordance with the configuration information.

29. The computer-readable medium of claim 27, further comprising instructions to cause the processor to configure the packet-forwarding engines to selectively update labels of the packets.

30. The computer-readable medium of claim 27, further comprising instructions to cause the processor to configure the packet-forwarding engines to selectively update time to live (TTL) fields of the packets.

31. A routing system comprising:
   a set of routing engines configured to act as a single network router, wherein the routing engines maintain routing information describing a topology of a network;
   a set of packet-forwarding engines to forward packets in accordance with the routing information;
   a switch to couple the packet-forwarding engines to the routing engines; and
   an interface to receive configuration information from a user, wherein the switch is reprogrammable to selectively couple the set of packet-forwarding engines to the set of routing engines to reconfigure the physical configuration of the routing system in response to the configuration information.

32. The routing system of claim 31, further comprising:
   a first chassis to house the routine engines; and
   a second chassis to house the packet-forwarding engines.

33. The routing system of claim 32, further comprising:
   a first chassis manager to manage the first chassis; and
   a second chassis manager to manage the second chassis.

34. The routing system of claim 31, further comprising a set of interface cards coupled to each of the packet-forwarding engines.

35. The routing system of claim 34, wherein the packet-forwarding engines associate each of the interface cards with a respective one of the routing engines.

36. The routing system of claim 31, wherein the interface is a command line interface (CLI) that allows a human administrator or a script to provide the configuration information.

37. The routing system of claim 31, further comprising a virtual network link to communicate packets between the routing engines.

38. The method of claim 1, wherein coupling the set of packet-forwarding engines to the set of routing engines comprises manually or automatically reprogramming a switch in response to the configuration information.

\* \* \* \* \*

UNITED STATES PATENT AND TRADEMARK OFFICE
CERTIFICATE OF CORRECTION

| | | |
|---|---|---|
| PATENT NO. | : 7,263,091 B1 | Page 1 of 1 |
| APPLICATION NO. | : 10/156720 | |
| DATED | : August 28, 2007 | |
| INVENTOR(S) | : Hsien-Chung Woo et al. | |

It is certified that error appears in the above-identified patent and that said Letters Patent is hereby corrected as shown below:

On Column 9, line 15 (claim 5), "or" should read --of--.

Signed and Sealed this

Twenty-sixth Day of August, 2008

JON W. DUDAS
*Director of the United States Patent and Trademark Office*